United States Patent
Tan et al.

(10) Patent No.: US 9,519,852 B2
(45) Date of Patent: *Dec. 13, 2016

(54) COMPACT FORM FACTOR INTEGRATED CIRCUIT CARD AND METHODS

(71) Applicant: Apple Inc., Cupertino, CA (US)

(72) Inventors: Tang Yew Tan, San Francisco, CA (US); Jason Sloey, San Jose, CA (US); Jared Kole, San Jose, CA (US); Naushad Zaveri, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/503,018

(22) Filed: Sep. 30, 2014

(65) Prior Publication Data

US 2015/0014421 A1 Jan. 15, 2015

Related U.S. Application Data

(63) Continuation of application No. 14/133,536, filed on Dec. 18, 2013, now Pat. No. 8,909,293, which is a continuation of application No. 13/440,911, filed on Apr. 5, 2012, now Pat. No. 8,620,271.

(60) Provisional application No. 61/481,114, filed on Apr. 29, 2011.

(51) Int. Cl.
| | |
|---|---|
| *H04M 1/68* | (2006.01) |
| *H05K 1/14* | (2006.01) |
| *G06K 19/077* | (2006.01) |
| *H04W 12/06* | (2009.01) |
| *H04L 29/06* | (2006.01) |
| *H04W 88/04* | (2009.01) |

(52) U.S. Cl.
CPC ... *G06K 19/07739* (2013.01); *G06K 19/07741* (2013.01); *G06K 19/07743* (2013.01); *G06K 19/07747* (2013.01); *H04L 63/0853* (2013.01); *H04W 12/06* (2013.01); *H04W 88/04* (2013.01)

(58) Field of Classification Search
CPC .......................... G06F 21/77; H04M 2250/14
USPC .. 455/411, 414.2, 456.1, 450, 558; 235/492; 361/764, 752, 737; 711/100
See application file for complete search history.

(56) References Cited

U.S. PATENT DOCUMENTS

| | | | |
|---|---|---|---|
| 6,768,645 B2 * | 7/2004 | Kadonaga ............ | G06K 19/077 235/492 |
| 2010/0025480 A1 * | 2/2010 | Nishizawa ........... | G06K 19/077 235/492 |
| 2011/0011939 A1 * | 1/2011 | Seah ................ | G06K 19/07749 235/492 |
| 2011/0165919 A1 * | 7/2011 | Weiss ................... | H04B 1/3833 455/572 |

* cited by examiner

*Primary Examiner* — Kiet Doan
(74) *Attorney, Agent, or Firm* — Downey Brand LLP

(57) ABSTRACT

A compact form factor integrated circuit card. In one embodiment, a Subscriber Identity Module (SIM) card is disclosed. In one embodiment, the SIM card has overall dimensions optimized for a particular application; e.g., 12.30 mm (±0.10 mm)×8.80 mm (0.10 mm)×0.67 mm (+0.03/−0.07). In another embodiment, the SIM card has overall dimensions of 11.90 mm (±0.10 mm)×8.80 mm (±0.10 mm)×0.70 mm (maximum). Multiple complementary SIM card adapters and methods of use are also disclosed.

20 Claims, 6 Drawing Sheets

COMPACT FORM FACTOR INTEGRATED CIRCUIT CARD AND METHODS

CROSS-REFERENCE TO RELATED APPLICATIONS

This application is a continuation of U.S. application Ser. No. 14/133,536, filed Dec. 18, 2013, entitled "COMPACT FORM FACTOR INTEGRATED CIRCUIT CARD AND METHODS," which is a continuation of U.S. application Ser. No. 13/440,911 filed Apr. 5, 2012, entitled "COMPACT FORM FACTOR INTEGRATED CIRCUIT CARD AND METHODS," now U.S. Pat. No. 8,620,271, issued on Dec. 31, 2013, which claims the benefit of U.S. Provisional Application No. 61/481,114 filed Apr. 29, 2011, entitled "COMPACT FORM FACTOR INTEGRATED CIRCUIT CARD AND METHODS," the contents of which are incorporated herein by reference in their entirety for all purposes.

FIELD

The present invention relates generally to the field of communications systems, and more particularly in one exemplary aspect to a form factor design for an integrated circuit card and adaptation for use with existing legacy cellular equipment.

BACKGROUND

A "smart card" or "integrated circuit card (ICC)" is a card that has been embedded with an integrated circuit. Smart cards are generally constructed as memory components and/or logic components embedded within a plastic form (e.g., polyvinyl chloride (PVC), acrylonitrile butadiene styrene or polycarbonate). Existing smart card form factors are shown in Table 1:

TABLE 1

| Type | Length | Width | Thickness |
|---|---|---|---|
| Full | 85.60 mm | 53.98 mm | 0.76 mm |
| Mini-SIM | 25 mm | 15 mm | 0.76 mm |
| Micro-SIM | 15 mm | 12 mm | 0.76 mm |

Smart card technology has been used extensively in cellular applications. Several popular cellular technologies control subscriber access with subscriber identity module (SIM) cards. Specifically, a SIM card contains an embedded logic component which shares cryptographic secrets with an authentication center. During operation, the device receives and/or transmits cryptographic challenges, and can generate and/or evaluate responses. Successful completion of a cryptographic exchange enables mutual verification of the authentication center and the SIM card (and by implication, the possessor of the SIM card). Successful verification enables a secure session between both parties for secure communication.

SUMMARY

The present invention provides, inter alia, methods and apparatus directed to a form factor design for an integrated circuit card, and adaptation for use with existing legacy cellular equipment.

In one aspect of the present invention, a smart card adapter apparatus is disclosed. In one embodiment, the smart card adaptor includes: a first substrate, the first substrate having a cavity extruded therefrom; the cavity adapted to house a smart card. The assembled first substrate and smart card enables operation of a mobile phone with the smart card.

In one variant, the first substrate is compliant with a Mini-SIM physical specification. In other variants, the first substrate is compliant with a Micro-SIM physical specification.

In other variants, the smart card is substantially 12.30 mm in length, 8.80 mm in width, and 0.67 mm thick. In another variant, the smart card is substantially 11.90 mm in length, 8.80 mm in width, and has a maximum thickness of 0.70 mm.

In yet another variant, the smart card is held in place with an adhesive mount, a friction mount or by electromagnetic force.

In a second aspect of the present invention, a smart card apparatus disclosed. In one embodiment, the smart card apparatus includes a plastic substrate; an integrated circuit configured to enable use of a wireless device; and at least one conductive structure in electrical conductance with the integrated circuit; wherein the plastic substrate has at least one mating feature; and wherein the integrated circuit and the at least one conductive structure are embedded within the plastic substrate.

In one variant, the plastic substrate includes polyvinyl chloride (PVC) or acrylonitrile butadiene styrene (ABS).

In another variant, the storage device includes stored cryptographic materials.

In yet another variant, the integrated circuit enables the use of a wireless device by performing wireless network authentication using the stored cryptographic materials.

In other variants, the smart card apparatus is substantially 12.30 mm in length, 8.80 mm in width, and 0.67 mm in height, or 11.90 mm in length, 8.80 mm in width, and has a maximum height of 0.70 mm.

In another variant, the smart card apparatus is configured to interface with at least one adapter card.

In a third aspect of the present invention, a subscriber identity module (SIM) apparatus is disclosed. In one embodiment, the SIM apparatus includes: a plastic substrate, including at least one mating feature; at least one conductive structure in electrical conductance with an integrated circuit; and the integrated circuit configured to enable use of a wireless device. The integrated circuit includes: a processor; and a storage device in data communication with the processor. The storage device includes computer-executable instructions configured to, when executed by the processor, perform wireless network authentication; and enable the use of a wireless device; wherein the integrated circuit and the at least one conductive structure arc embedded within the plastic substrate.

In one variant, the processor and the storage device in data communication with the processor are protected from tampering with non-conductive resin and/or shielding.

In other variants, the SIM apparatus is substantially 12.30 mm in length, 8.80 mm in width, and 0.67 mm in height, or 11.90 mm in length, 8.80 mm in width, and has a maximum height of 0.70 mm.

Further features of the present invention, its nature and various advantages will be more apparent from the accompanying drawings and the following detailed description.

DETAILED DESCRIPTION

Figure 1:
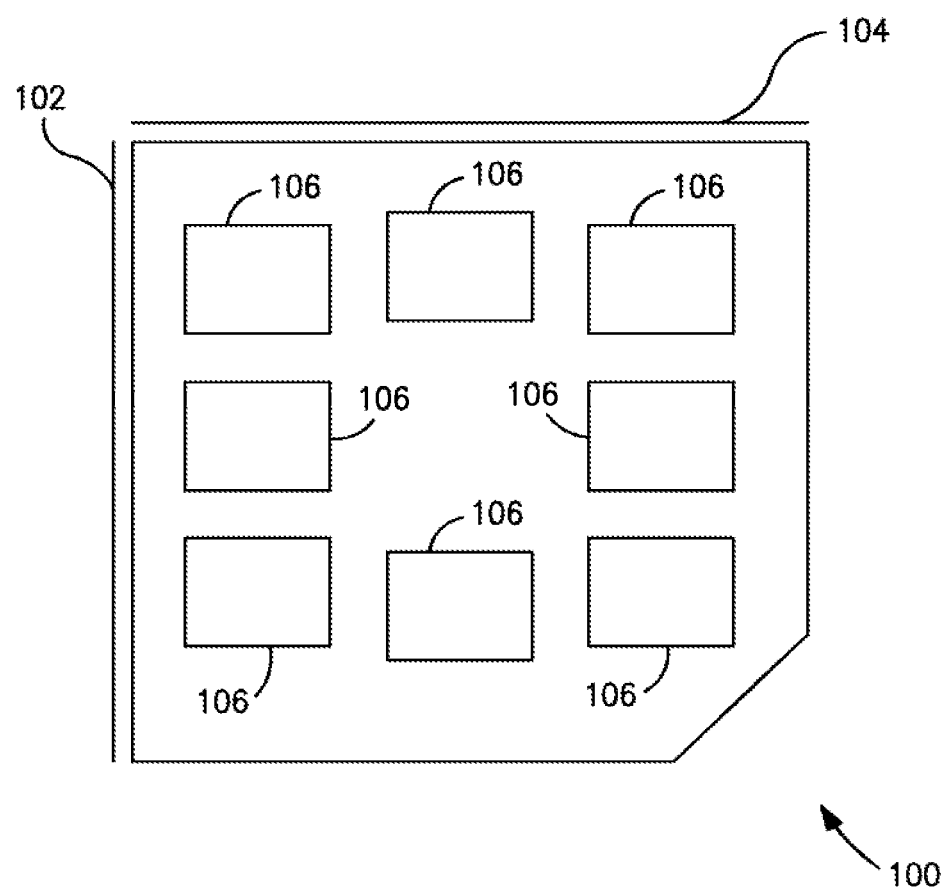
FIG. 1 is a graphic representation of one embodiment of a Universal Integrated Circuit Card (UICC) in accordance with the present invention.

Reference is now made to the drawings wherein like numbers refer to like parts throughout.

Overview

Current industrial design priorities are focused on increasingly smaller and slimmer mobile devices. This trend has created a need for smaller components, since existing component form factors limit the overall mobile device size. Furthermore, since each SIM card uniquely authenticates a subscriber to the cellular network, improved solutions for SIM card design would ideally remain backward compatible with legacy SIM card form factors, thereby enabling SIM card use with devices that accept legacy SIM card form factors.

The present invention provides, inter alia, methods and apparatus for a Subscriber Identity Module (SIM) card. In one aspect of the present invention, a SIM card is disclosed having overall dimensions of 12.30 mm (±0.10 mm)×8.80 mm (±0.10 mm)×0.67 mm (+0.03/−0.07). In another aspect of the present invention, a SIM card is disclosed having overall dimensions of 11.90 mm (±0.10 mm)×8.80 (±0.10 mm)×0.70 mm (maximum).

In a second aspect of the present invention, a SIM card adapter is disclosed having overall dimensions of 25.10 mm (±0.10 mm)×15.10 mm (±0.10 mm)×0.84 mm (maximum). In one embodiment, the SIM card adapter has a depression with a minimum depth of 0.74 mm, configured to house a SIM card within. In one such variant, the depression is further layered with an adhesive substance, so as to assist in affixing the SIM card in a semi-permanent manner.

In a third aspect of the present invention, a SIM card adapter is disclosed having overall dimensions of 15.00 mm (±0.10 mm)×12.00 mm (±0.10 mm)×0.84 mm (maximum). In one embodiment, the SIM card adapter has a depression with a minimum depth of 0.74 mm, configured to house a SIM card within. In one such variant, the depression is further layered with an adhesive substance, so as to assist in affixing the SIM card in a semi-permanent manner.

Methods for use are also discussed in greater detail hereinafter.

DETAILED DESCRIPTION OF EXEMPLARY EMBODIMENTS

Exemplary embodiments and aspects of the present invention are now described in detail. While these embodiments and aspects are primarily discussed in the context of Subscriber Identity Modules (SIMs) of a GSM, GPRS/EDGE, or UMTS cellular network, it will be recognized by those of ordinary skill that the present invention is not so limited. In fact, the various aspects of the invention are useful in any network (whether wireless cellular or otherwise) or other type of application that can benefit from small form factor integrated circuit cards.

It will also be recognized that while the term "subscriber identity module" is used herein (e.g., SIM), this term in no way necessarily connotes or requires either (i) use by a subscriber per se (i.e., the invention may be practiced by a subscriber or non-subscriber); or (ii) identity of a single individual (i.e., the invention may be practiced on behalf of a group of individuals such as a family, or intangible or fictitious entity such as an enterprise).

Exemplary Universal Integrated Circuit Card Form Factors

Referring now to FIG. 1, one embodiment of a Universal Integrated Circuit Card (UICC) 100 is illustrated.

In a first embodiment, the UICC is 12.30 mm in length, with a tolerance of 0.10 mm; 8.80 mm in width, with a tolerance of 0.10 mm; and 0.67 mm thick, with a tolerance of (+0.03/−0.07) mm. In one variant, one corner of the UICC has been chamfered off at 45 degrees (1.65 mm×1.65 mm), and the resulting five edges have been rounded to a radius of 0.80 mm (±0.10 mm).

In a second embodiment, the UICC is 11.90 mm in length, with a tolerance of 0.10 mm; 8.80 mm in width, with a tolerance of 0.10 mm; and has a maximum thickness of 0.70 mm. In one variant, one corner of the UICC has been chamfered off at 45 degrees (1.25 mm×1.25 mm), and the resulting five edges have been rounded to a radius of 0.80 mm (±0.10 mm).

In one embodiment, the UICC of FIG. 1 can be further embedded or formed within a larger form factor (e.g., for ease of delivery); in one such variant, the UICC is formed into a card of approximate dimensions 85.60 mm×53.98 mm×0.76 mm, located 18.22 mm (±0.10 mm) from the upper edge, and 9.25 mm (±0.10 mm) from the left edge of the card.

The UICC further includes one or more conductive structures (e.g., electrical contacts, pins, pads, etc.) coupled to an embedded integrated circuit. In one embodiment, the conductive structures may be adapted for carrying electrical signaling including but not limited to: (i) clock, (ii) reset, (iii) power, (iv) ground, (v) and one or more input or output connections. In one first embodiment, the UICC has eight (8) contacts including: (i) CLOCK, (ii) RESET, (iii) VCC, (iv) OP1, (v) GND, (vi) SWP (single wire protocol), (vii) I/O (input output), and (viii) OP2. In a second embodiment, the UICC has six (6) contacts including: (i) CLOCK, (ii) RESET, (iii) VCC, (iv) GND, (v) SWP (single wire protocol), and (vi) I/O (input output).

As shown in FIG. 1, one embodiment of the UICC is constructed in accordance with a first and second reference edge (102, 104 respectively).

In one variant, the CLOCK, RESET and VCC begin at most 1 mm from the first reference edge 102 of the UICC 100, and extend at least 3 mm from the first reference edge 102. In one such variant, the GND, SWP and I/O begin at most 8.62 mm from the first reference edge 102 of the UICC, and extend at least 10.62 mm from the first reference edge 102.

In one variant, the CLOCK and GND begin at most 1.01 mm from the second reference edge 104 of the UICC 100, and extend at least 2.71 mm from the second reference edge 104. In one variant, the RESET and SWP begin at most 3.55 mm from the second reference edge 104 of the UICC, and extend at least 5.25 mm from the second reference edge 104.

In one variant, the VCC and I/O begin at most 6.09 mm from the second reference edge 104 of the UICC, and extend at least 7.79 mm from the second reference edge 104.

In one such variant, the OP1 and OP2 begin at most 4.81 mm from the first reference edge of the UICC, and extend at least 6.81 mm from the first reference edge.

In one variant, the OP1 begins at most 0.81 mm from the second reference edge 104 of the UICC, and extend at least 2.51 mm from the second reference edge 104. In one variant, the OP2 begins at most 6.29 mm from the second reference edge 104 of the UICC, and extend at least 7.99 mm from the second reference edge 104.

In one embodiment, the UICC 100 is constructed of an integrated circuit in electrical conductance with the one or more conductive structures 106. In one embodiment, the integrated circuit and conductive structures are housed within a plastic, such as (but not limited to) polyvinyl chloride (PVC), acrylonitrile butadiene styrene, polycarbonate, etc.

The housed integrated circuit is further configured to perform wireless (e.g., cellular) network authentication, based on one or more stored cryptographic materials, and accordingly to enable use of a wireless device (e.g., cellular phone or the like). In one variant, the cryptographic materials and associated integrated circuit processor are further protected from malicious use and/or tampering with non-conductive resin and/or shielding.

Example #1

Figure 2A:
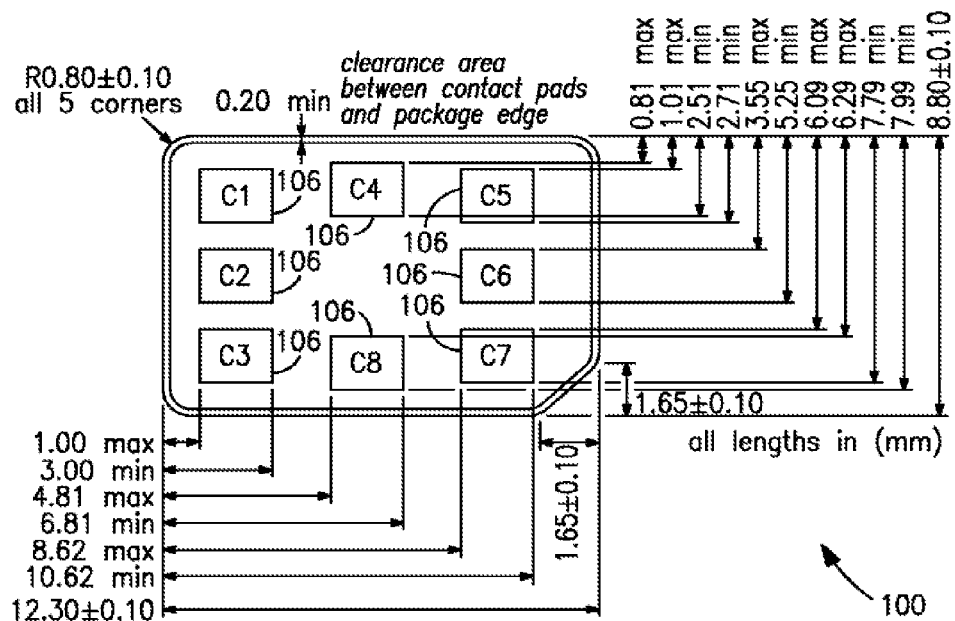
FIG. 2A is a top plan view of a first exemplary embodiment of a Universal Integrated Circuit Card (UICC) in accordance with the present invention.
Figure 2B:
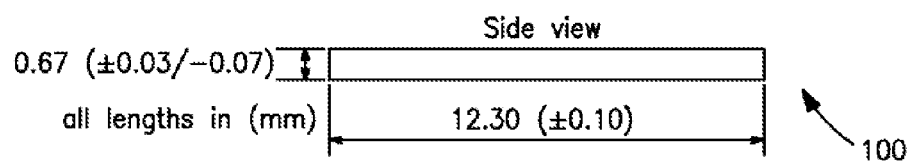
FIG. 2B is a side plan view of the UICC of FIG. 2A.

Referring now to FIG. 2A one first exemplary embodiment of the UICC 100 is shown. In this embodiment, the UICC is 12.30 mm in length, with a tolerance of 0.10 mm; and 8.80 mm in width, with a tolerance of 0.10 mm. In one variant, one corner of the UICC has been chamfered off at 45 degrees (1.65 mm×1.65 mm), and the resulting five edges have been rounded to a radius of 0.80 mm (±0.10 mm). The UICC has numerous electrical contact pads 106 disposed on its surface at locations designated in millimeters. Referring now to FIG. 2B, a side view of the first exemplary embodiment of the UICC 100 of FIG. 2A is shown. In this embodiment, the UICC is 0.67 mm thick, with a tolerance of (+0.03/−0.07) mm.

Example #2

Figure 2C:
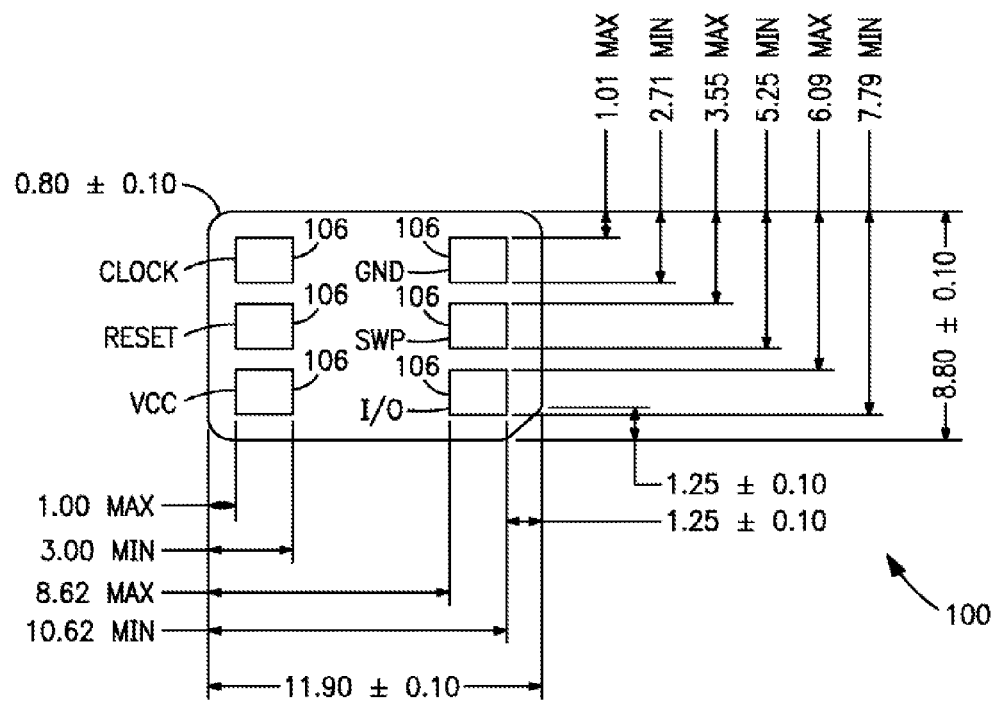
FIG. 2C is a top plan view of a second exemplary embodiment of a Universal Integrated Circuit Card (UICC) in accordance with the present invention.
Figure 2D:
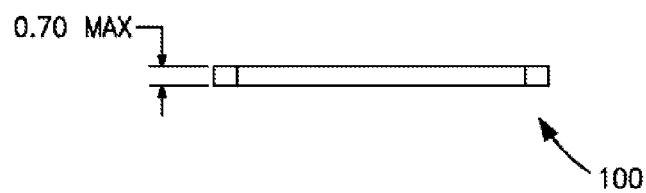
FIG. 2D is a side plan view of the UICC of FIG. 2C.

Referring now to FIG. 2C one second exemplary embodiment of the UICC 100 is shown. In this second embodiment, the UICC is 11.90 mm in length, with a tolerance of 0.10 mm; and 8.80 mm in width, with a tolerance of 0.10 mm. In one variant, one corner of the UICC has been chamfered off at 45 degrees (1.25 mm×1.25 mm), and the resulting five edges have been rounded to a radius of 0.80 mm (±0.10 mm). The UICC has numerous electrical contact pads 106 disposed on its surface at locations designated in millimeters. Referring now to FIG. 2D, a side view of the second exemplary embodiment of the UICC 100 of FIG. 2C is shown. In this embodiment, the UICC has a maximum thickness of 0.70 mm.

Exemplary Universal Integrated Circuit Card Adapter

To ensure compatibility with legacy devices, the Universal Integrated Circuit Card (UICC) of FIG. 1 is further configured to interface with one or more adapter cards. Exemplary embodiments of adapter cards are constructed of plastic, such as polyvinyl chloride (PVC), acrylonitrile butadiene styrene, polycarbonate, etc. Two exemplary embodiments are described in greater detail herein:

Mini-SIM (2FF) Card Adapter

Figure 3:
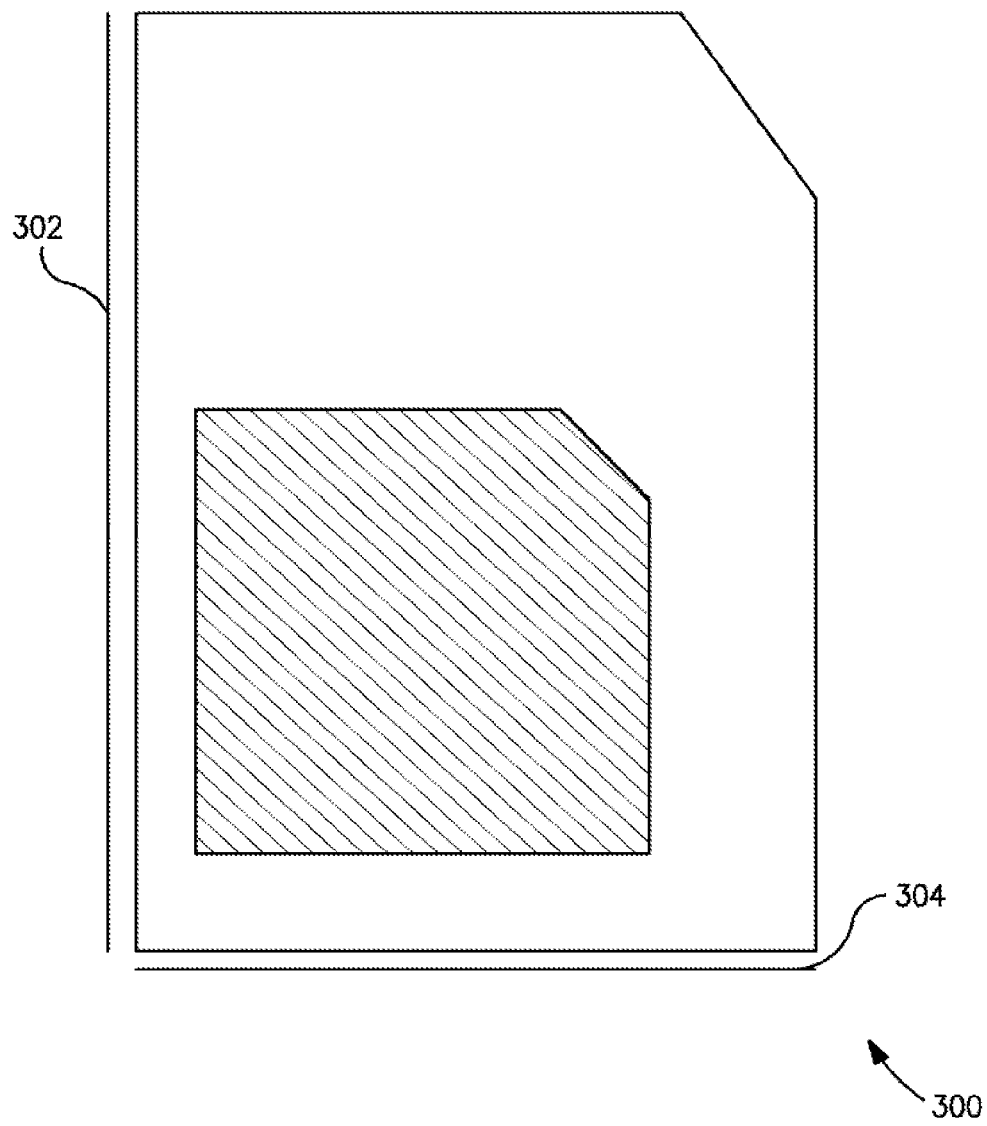
FIG. 3 is a top elevation view of one exemplary embodiment of a Mini-SIM (2FF) card adapter in accordance with the present invention.

Referring now to FIG. 3, one exemplary embodiment of a Mini-SIM (2FF) card adapter 300 is illustrated. In this embodiment, the card adapter is 25.10 mm in length, with a tolerance of 0.10 mm; 15.10 mm in width, with a tolerance of 0.10 mm; and has a maximum thickness of 0.84 mm. In one variant, one corner of the card adapter has been chamfered off at 45 degrees (2.5 mm×2.5 mm), and the resulting five edges have been rounded to a radius of 0.80 mm (±0.10 mm).

As shown in FIG. 3, one exemplary embodiment of the card adapter is constructed in accordance with a first and second reference edge (302, 304 respectively). The card adapter has an exposed cavity beginning at 1.74 mm (±0.05 mm) from the first edge 302, ending 10.64 mm (±0.05 mm) from the first edge, and beginning at 3.00 mm (±0.05 mm) from the second edge 304, ending 15.40 mm (±0.05 mm) from the second edge. In one such variant, the cavity retains at least one mating element, such that a properly mated card will mate in one position, and one position only. The mating element is in one embodiment a corner of retained material adapted to match a chamfered card (e.g., 1.70 mm×1.70 mm, at 45 degrees). In one implementation, the bordering five edges of the cavity are further filleted with a radius of 0.85 mm (±0.10 mm).

Another exemplary embodiment of the card adapter, as shown in FIG. 3, is also constructed in accordance with a first and second reference edge (302, 304 respectively). The card adapter has an exposed cavity beginning at 1.74 mm (±0.05 mm) from the first edge 302, ending 10.64 mm (±0.05 mm) from the first edge, and beginning at 3.00 mm (±0.05 mm) from the second edge 304, ending 15.00 mm (±0.05 mm) from the second edge. In one such variant, the cavity retains at least one mating element, such that a properly mated card will mate in one position, and one position only. The mating element is a corner of retained material adapted to match a chamfered card (e.g., 1.3 mm×1.3 mm, at 45 degrees). In one implementation, the bordering five edges of the cavity are further filleted with a radius of 0.85 mm (±0.10 mm).

In one embodiment, the exposed cavity has a minimum depth of 0.74 mm, and a layer of adhesive applied no closer than 0.20 of the filleted edges. The adhesive is of sufficient strength to retain or adhere a UICC within the exposed cavity. The adhesive may be of the type to allow temporary retention of the SIM (i.e., the SIM is removable), or may alternately be of a more permanent nature if desired.

As yet another alternative, the smart card (e.g., SIM) may be frictionally received within the adapter (e.g., "snap" in and out); see discussion below with respect to FIG. 3. Yet other schemes for card retention will be recognized by those of ordinary skill given the present disclosure.

In one aspect of the present invention, the Mini-SIM card adapter 300 of FIG. 3 enables a UICC 100 to operate with mobile phone devices having legacy Mini-SIM form factor card interfaces.

Micro-SIM (3FF) Card Adapter

Figure 4:
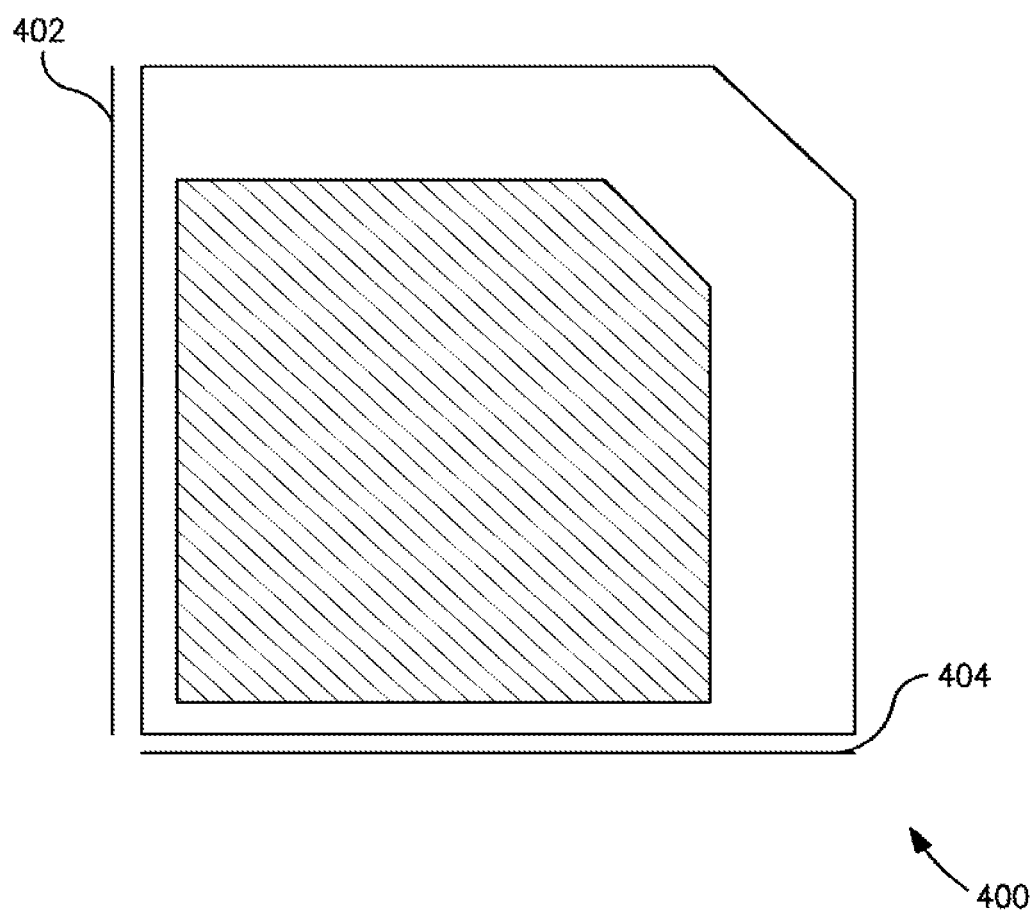
FIG. 4 is a top elevation view of one exemplary embodiment of a Micro-SIM (3FF) card adapter in accordance with the present invention.

Referring now to FIG. 4, one exemplary embodiment of a Micro-SIM (3FF) card adapter 400 is illustrated. In this embodiment, the card adapter is 15.00 mm in length, with a tolerance of 0.10 mm; 12.00 mm in width, with a tolerance of 0.10 mm; and has a maximum thickness of 0.84 mm. In one variant, one corner of the Micro-SIM (3FF) card adapter has been chamfered off at 45 degrees (2.5 mm×2.5 mm), and the resulting five edges have been rounded to a radius of 0.80 mm (±0.10 mm).

As shown in FIG. 4, one exemplary embodiment of the card adapter is constructed in accordance with a first and second reference edge (402, 404 respectively). The illustrated card adapter has an exposed cavity beginning at 0.28 mm (±0.05 mm) from the first edge 402, ending 9.18 mm (±0.05. mm) from the first edge, and beginning at 1.10 mm (±0.05 mm) from the second edge 404, ending 13.50 mm (±0.05 mm) from the second edge. In one such variant, the cavity retains at least one mating element, such that a properly mated card will mate in one position, and one position only. The mating element in this embodiment is a corner of retained material adapted to match a chamfered card (e.g., 1.70 mm×1.70 mm, at 45 degrees). The bordering five edges of the cavity are further filleted with a radius of 0.85 mm (±0.10 mm).

Another embodiment of the illustrated card adapter has an exposed cavity beginning at 0.28 mm (±0.05 mm) from the first edge 402, ending 9.18 mm (±0.05 mm) from the first edge, and beginning at 1.10 mm (±0.05 mm) from the second edge 404, ending 13.10 mm (±0.05 mm) from the second edge. In one such variant the cavity retains at least one mating element, such that a properly mated card will mate in one position, and one position only. The mating element in this embodiment is a corner of retained material adapted to match a chamfered card (e.g., 1.3 mm×1.3 mm, at 45 degrees). The bordering five edges of the cavity are further filleted with a radius of 0.85 mm (±0.10 mm).

In one such variant, the exposed cavity has a minimum depth of 0.74 mm, and a layer of adhesive applied no closer than 0.20 of the filleted edges. As with the prior embodiment, the adhesive is of sufficient strength to retain adhere a UICC within the exposed cavity, and may be of the type to allow temporary retention of the SIM (i.e., the SIM is removable), or alternately be of a more permanent nature if desired, or utilize frictional or another means for retention.

In one aspect of the present invention, the Mini-SIM card adapter of FIG. 4 enables a UICC to operate with mobile phone devices having legacy Micro-SIM form factor card interfaces.

Methods

Figure 5:
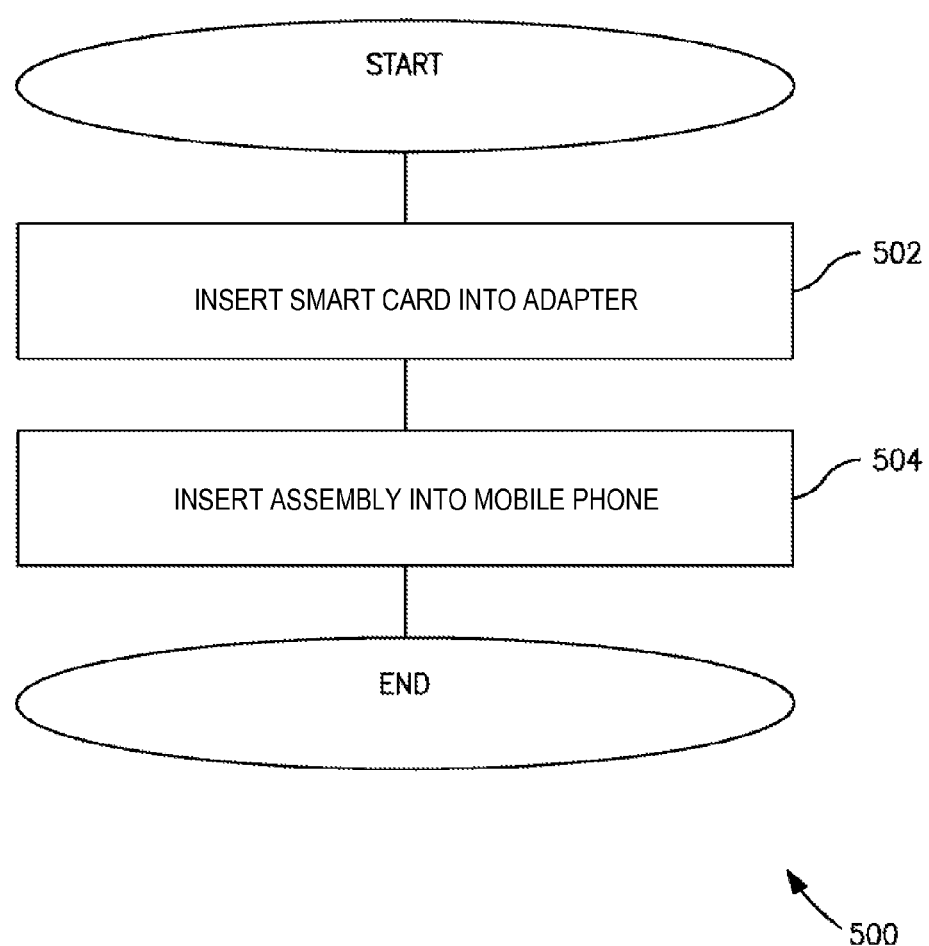
FIG. 5 is a logical flow chart illustrating one exemplary method for using a smart card with a mobile phone in accordance with various aspects of the present invention.

FIG. 5 illustrates one exemplary method 500 for using a smart card with a mobile phone in accordance with various aspects of the present invention.

At step 502, a smart card element is inserted within a smart card adapter. In one implementation, the smart card adapter has a cavity adapted to hold the smart card element. In one variant, the smart card is affixed with the aid of an adhesive substance layered in the smart card adapter cavity. In alternate variants, the smart card is affixed with the aid of an adhesive substance on the smart card itself, or alternatively via the aforementioned frictional fit (or both).

In some embodiments, the adhesive may be farther protected with a thin protective skin or paper or plastic layer (e.g., waxed peel-off), the protective skin preventing the adhesive layer from coming in contact with debris. The protective skin can be removed just prior to mating the smart card adapter to the smart card.

In alternate embodiments, the smart card is held in place with a friction mount, i.e., one or more exposed features of the smart card adapter flexibly deform during smart card insertion, and prevent the smart card from unmating. In alternate embodiments, the smart card is held in place with a physical locking mechanism. For example, in some embodiments, the smart card may rotate, or slide into a spring-locked mechanism. In still other embodiments, the smart card is held in place with an electromagnetic force, such as magnetism.

In one embodiment, the smart card adapter is configured so that it can mate with the smart card in one and only one configuration. For example, the smart card and smart card adapter may have complementary interlocking features which prevent incorrect mating. These interlocking features may be mechanical (e.g., a mating feature), or electromagnetic, or otherwise.

At step 504, the smart card element and smart card adapter accessory is inserted within a mobile phone for use. The SIM card enables the mobile device to operate via the aforementioned authentication process. SIM card operation is well known in the related arts, and not discussed further.

In another embodiment of the method, the SIM card is inserted into a first "non-legacy" phone alone (i.e., without the adapter). The phone is activated and used as previously described. Then, when the user wishes to use the SIM with another (legacy) phone, the user removes the SIM from the non-legacy phone, inserts the SIM into the adapter, and then inserts the SIM and adapter as a unit within the legacy phone, thereby enabling its operation. In this way, the same SIM can enable operation of heterogeneous types of mobile devices.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A smart card adapter apparatus, comprising:
   a substrate that includes a cavity configured to receive a separate and self-contained smart card having:
      a profile size of: between 12.20 mm and 12.40 mm in length, and between 8.70 mm and 8.90 mm in width,
      an integrated circuit, and
      at least one conductive structure in electrical conductance with the integrated circuit, wherein the integrated circuit and the at least one conductive structure are embedded within the smart card adapter apparatus; and
   wherein, when the smart card adapter apparatus is inserted into the cavity, and the smart card adapter apparatus is inserted into a Subscriber Identity Module (SIM) card bay having a profile size that is different from the profile size of the smart card adapter apparatus, operation of a mobile phone that includes the SIM card bay is enabled.

2. The smart card adapter apparatus of claim 1, wherein the substrate is compliant with a Mini-SIM physical specification.

3. The smart card adapter apparatus of claim 1, wherein the substrate is compliant with a Micro-SIM physical specification.

4. The smart card adapter apparatus of claim 1, wherein a perimeter shape of the cavity defines a mating feature that requires the smart card adapter apparatus to be inserted into the cavity according to a particular orientation.

5. The smart card adapter apparatus of claim 1, wherein the cavity comprises an adhesive mounting component.

6. The smart card adapter apparatus of claim 5, wherein the adhesive mounting component temporarily or permanently mounts the smart card adapter apparatus within the cavity.

7. The smart card adapter apparatus of claim 1, wherein the cavity comprises a friction mounting component.

8. The smart card adapter apparatus of claim 7, wherein the friction mounting component enables the smart card adapter apparatus to be snapped-in and snapped-out of the cavity.

9. The smart card adapter apparatus of claim 1, wherein the cavity comprises an electromagnetic force mounting component.

10. The smart card adapter apparatus of claim 1, wherein the substrate has a profile size of between 25.00 mm and 25.20 mm in length and between 15.00 mm and 15.20 mm in width.

11. The smart card adapter apparatus of claim 1, wherein the substrate has a profile size of between 14.90 mm and 15.10 mm in length and between 11.90 mm and 12.10 mm in width.

12. A smart card adapter apparatus, comprising:
a substrate that includes a cavity configured to receive a separate and self-contained smart card having:
a profile size of: between 12.20 mm and 12.40 mm in length, and between 8.70 mm and 8.90 mm in width, and
an integrated circuit configured to enable use of a wireless device by performing network authentication using stored cryptographic data, wherein a perimeter shape of the cavity defines a mating feature that requires the smart card adapter apparatus to be inserted into the cavity according to a particular orientation; and
wherein, when the smart card adapter apparatus is inserted into the cavity, and the smart card adapter apparatus is inserted into a Subscriber Identity Module (SIM) card bay having a profile size that is different from the profile size of the smart card adapter apparatus, operation of a mobile phone that includes the SIM card bay is enabled.

13. The smart card adapter apparatus of claim 12, wherein the cavity comprises an adhesive mounting component.

14. The smart card adapter apparatus of claim 13, wherein the adhesive mounting component temporarily or permanently mounts the smart card adapter apparatus within the cavity.

15. The smart card adapter apparatus of claim 12, wherein the cavity comprises a friction mounting component.

16. The smart card adapter apparatus of claim 15, wherein the friction mounting component enables the smart card adapter apparatus to be snapped-in and snapped-out of the cavity.

17. The smart card adapter apparatus of claim 12, wherein the cavity comprises an electromagnetic force mounting component.

18. The smart card adapter apparatus of claim 12, wherein a perimeter shape of the cavity defines a mating feature that requires the smart card adapter apparatus to be inserted into the cavity according to a particular orientation.

19. The smart card adapter apparatus of claim 12, wherein the substrate has a profile size of between 25.00 mm and 25.20 mm in length and between 15.00 mm and 15.20 mm in width.

20. The smart card adapter apparatus of claim 12, wherein the substrate has a profile size of between 14.90 mm and 15.10 mm in length and between 11.90 mm and 12.10 mm in width.

* * * * *